United States Patent [19]

Kipp et al.

[11] Patent Number: 4,489,964
[45] Date of Patent: Dec. 25, 1984

[54] MEMORY METAL CONNECTOR

[75] Inventors: Robert M. Kipp; Ray R. Ayers, both of Houston, Tex.

[73] Assignee: Shell Oil Company, Houston, Tex.

[21] Appl. No.: 335,913

[22] Filed: Dec. 30, 1981

[51] Int. Cl.³ .............................................. F16L 21/00
[52] U.S. Cl. ...................................... 285/374; 29/447; 285/381; 285/422
[58] Field of Search ..................... 285/381, 422, 374; 29/447

[56] References Cited

U.S. PATENT DOCUMENTS 3,730,562 5/1973 Viazzi ............................. 285/381 X
4,314,718 2/1982 Broyles et al. ................. 285/381 X
4,379,575 4/1983 Martin ............................ 285/381 X

FOREIGN PATENT DOCUMENTS 2306784 11/1976 France ............................... 285/381
7512564 4/1977 Netherlands ....................... 285/381

Primary Examiner—Thomas F. Callaghan

[57] ABSTRACT

A connector for joining pipe ends is provided having two memory metal lock rings which are heat-shrinkable about a pipe end and a memory metal rod/wedge ring, heat-shrinkable at a higher temperature or in a delayed mode, to secure the lock rings.

4 Claims, 3 Drawing Figures

MEMORY METAL CONNECTOR

BACKGROUND OF THE INVENTION

In both offshore and onshore pipeline construction, the manually welded joint has become the standard by which other forms of pipeline joining are evaluated. Pipe joining, by whatever means, is more costly offshore where weather conditions can severely hinder pipeline construction operations. In recent years considerable improvements have been made in conventional pipelaying systems, and more specifically in pipe joining processes. Semi-automatic and then fully automatic welding systems have been developed, proven in the field, and now accepted offshore. However, the art remains deficient in the provision of mechanical connectors for diverless, subsea tie-ins of large diameter pipe in deep water. Accordingly, the present invention is directed to overcoming this deficiency of the art.

DISCUSSION OF THE PRIOR ART

Metallic compositions that are known to be capable of undergoing a reversible transformation from the austenitic state to the martensitic include unalloyed metals but this phenomenon is most commonly exhibited by alloys. Such alloys include, for example, those disclosed in U.S. Pat. Nos. 4,146,392; 4,036,669; 3,783,037; 3,759,552; 3,753,700; 3,567,523; 3,351,463; 3,174,851; 3,012,882; Belgian Pat. No. 703,649 and British Pat. Nos. 2,315,652; 1,315,653; 1,346,046 and 1,346,047. The disclosures of each of the aforementioned patents is incorporated herein by reference.

Such alloys are disclosed in NASA Publication SP110, "55-Nitinol-The Alloy With A Memory, etc." (U.S. Government Printing Office, Washington, D.C., 1972); N. Nakanishi et al, *Scripta Mettallurgica* 5, 433–440 (Pergamon Press, 1971); *Journal of the Institute of Metals,* 1966, Volume 94, "Study of Secondary Recrystalization and of the Effects of Thermal Cycling in Zone-Refined Zinc", A. Desalvo et al; *Machine Design,* Oct. 25, 1975, pages 113–117, "New Uses for Metals That Remember", David T. Curry; brochures by Raychem Corporation, "Join Copper to Aluminum Tubing the Easy Way'", January 1980; "Betalloy, A Metal Alloy With A Memory", undated, and "Cryofit-The Better Way to Join Pipes", undated, the disclosures of which are likewise incorporated herein by reference.

SUMMARY OF THE INVENTION

The present invention pertains to a connector for joining pipe ends entailing a connector housing insertable over a pipe end, memory metal means operative within said housing to grip and seal the pipe end, and means for activating the memory metal means. The connector has means separate from the combination gripping and sealing means for sealing the connector housing to the pipe end to prevent contact of transported product with the memory metal means. Preferably, the sealing means is an elastomer wiper circumferentially attached inside the housing and contacting the pipe end. The memory metal means is either expandable or contractable upon activation. Preferably, the memory metal gripping means is enforceable against the pipe end surface by a wedge loading ring which is drivable by memory metal wedge ring activators.

DESCRIPTION OF PREFERRED EMBODIMENTS

Both organic and metallic materials capable of being rendered heat recoverable are well known. An article made from such materials can be deformed from an original, heat-stable configuration to a second, heat-unstable configuration. The article is said to be heat recoverable for the reason that, upon the application of heat, it can be caused to revert from its heat-unstable configuration to its original, heat-stable configuration. Among metals, for example certain alloys of titanium and nickel, the ability to be rendered heat recoverable is a result of the fact that the metal undergoes a reversible transformation from an austenitic state to a martensitic state with changes in temperature. An article made from such a metal, for example, a hollow sleeve, is easily deformed from its original configuration to a new configuration when cooled below the temperature at which the metal is transformed from the austenitic state to the martensitic state. When an article thus deformed is cooled to the temperature at which the metal becomes martensitic, it can be easily expanded to a larger diameter, for example, by using a mandrel. If the expanded sleeve is subsequently allowed to warm to the temperature at which the metal reverts back to its austenitic state, the sleeve will revert to its original dimensions.

Figure 1:
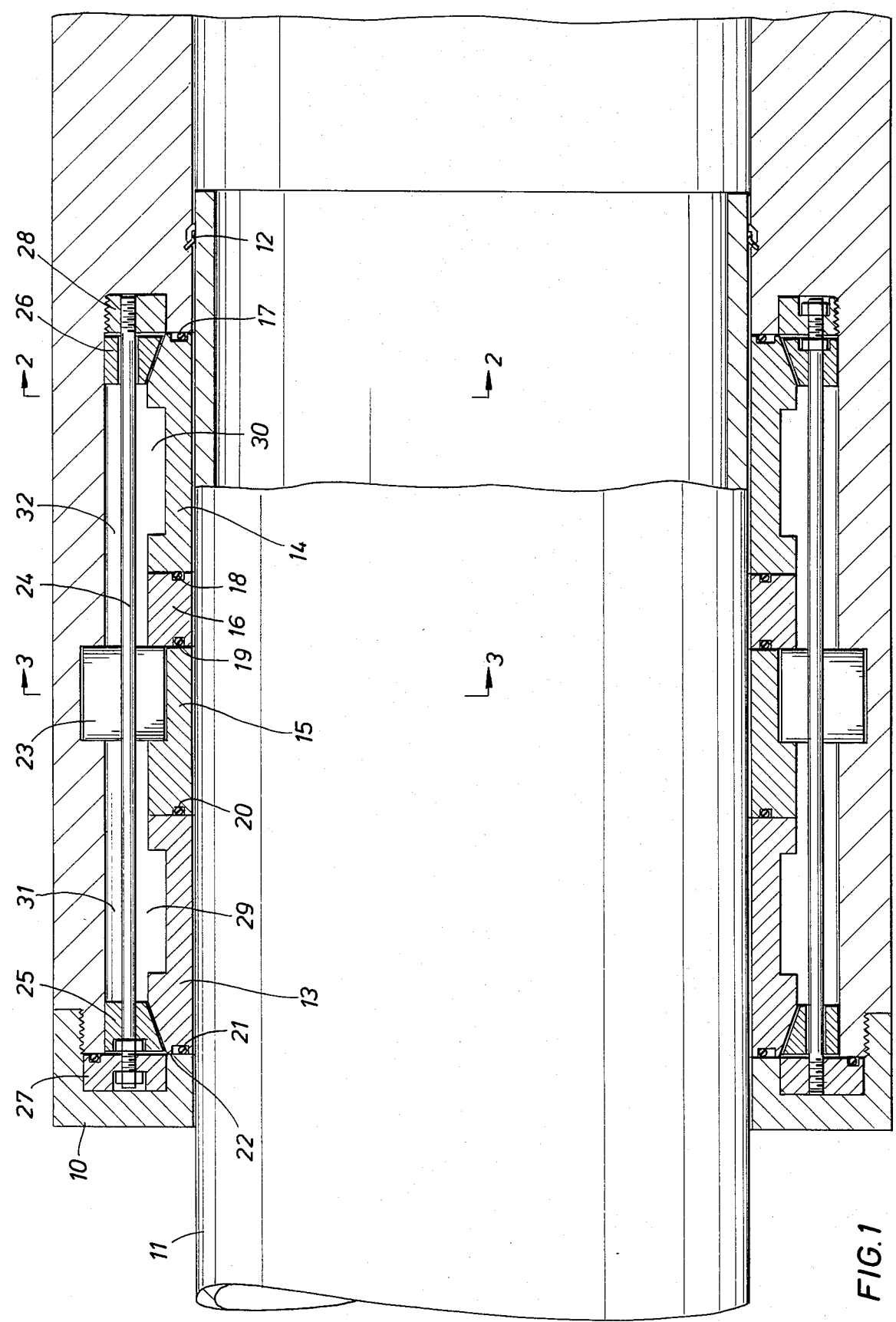
FIG. 1 shows a sectional view of a memory metal lap joint connector.

Referring now to FIG. 1 of the present invention, there is shown a memory metal lap joint connector, which might fit for example, a 24-inch diameter pipe. A connector housing 10 is inserted over a pipe end 11. The connector housing seals by means of elastomer wiper 12 which is closely adjacent to one end of the pipe. Inside the connector housing 10 are two memory metal lock rings 13 and 14 which encircle pipe 11. Spacer rings 15 and 16 separate memory metal lock rings 13 and 14. Seals 17, 18, 19, 20 and 21 separate the lock rings and spacer rings and connector housing End 22 of the memory metal lock ring 13 is preferably plated for corrosion protection. Above spacer ring 15 is situated a load transfer collet 23 which fits in a shoulder of the spacer ring 15 and is contained on the opposite side by a groove in the connector housing. Passing through the load transfer collet are memory metal rod activators 24 which connect two lock wedge rings 25 and 26 which are, in turn, connected to the housing by anchor ring for rod activators 27 and 28. One half of the memory metal rod activators 24 connect lock wedge ring 25 with anchor ring 28, while the other half connects lock wedge ring 26 with anchor ring 27. Activation of memory metal lock rings 13 and 14 and memory metal rods 24 is accomplished by injecting a heated fluid into spaces 29, 30, 31 and 32 which encircle the pipe.

Figure 2:
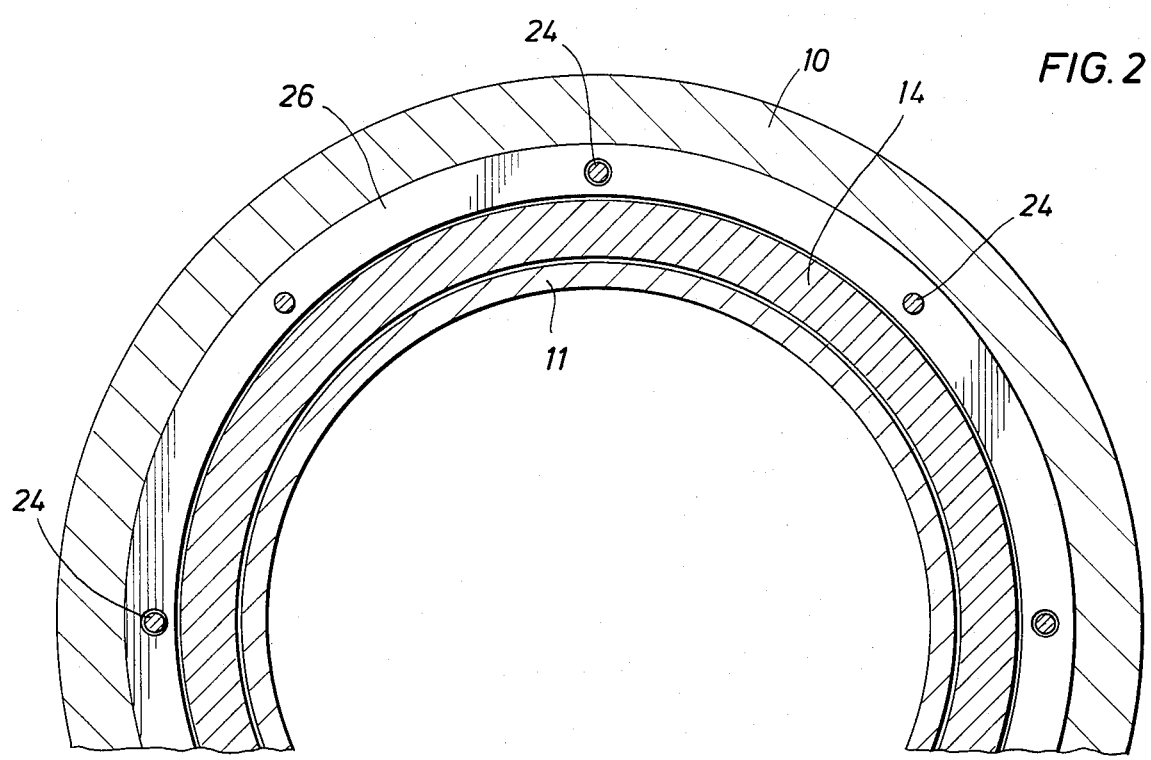
FIG. 2 is a view along section 2—2 of FIG. 1.
Figure 3:
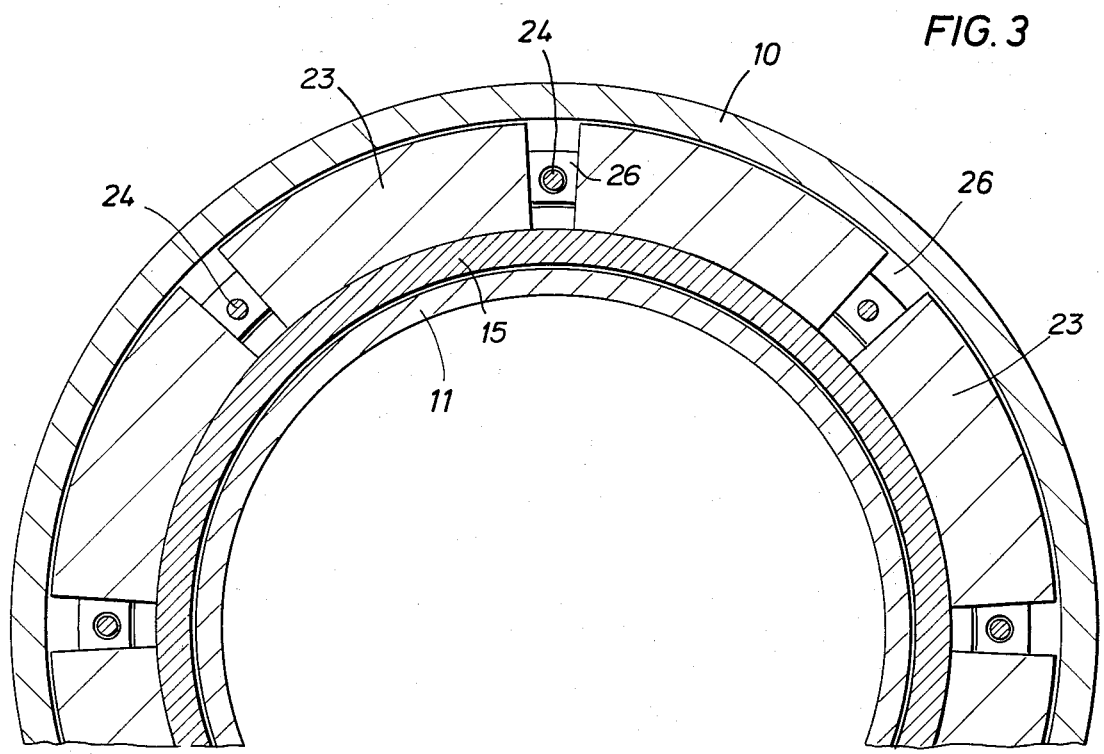
FIG. 3 is a view along section 3—3 of FIG. 1.

FIG. 2 is a view of FIG. 1 of the drawings along the section lines 2—2. There are for example eight memory metal rods, four of which anchor into the wedge ring and four which pass through it. FIG. 3 is a view of FIG. 1 along the lines 3—3 as shown in FIG. 1 which further shows the detail of the invention.

Load Transfer—The connector of the present invention transfers not only axial loads but also bending moments. The two memory metal lock rings 13 and 14 are shrunk onto the exterior of pipe 11. By relying on friction between the remory metal and the pipe, and/or extra roughness (i.e., indentions) on the memory metal surface, each ring alone could carry the axial load.

When the memory metal rings 13 and 14 collapse to fit pipe 11, radial spaces 29 and 30 are created between the memory metal rings 13 and 14 and the connector housing 10. This space must be filled for load transfer of bending moments. Accordingly, the space is filled by two lock wedge rings 25 and 26 (one for each memory metal ring). The lock wedge rings 25 and 26 are widely spaced to minimize loads imposed on them by bending, and are driven by memory metal rods 24 set to activate at higher temperatures than memory metal rings 13 and 14. To achieve favorable taper on wedge rings 25 and 26, they must have rods 24 as long as possible (the motion of radial rings 13 and 14 is about 0.25-inches, therefore it is desirable to have at least 0.75-inches stroke of wedge rings 25 and 26). This is accomplished by using separate rods for each set of wedge rings. The rods pass through wedge rings 25 and 26 to anchor points 27 and 28.

Assembly—Assembly is accomplished by installing the first anchor ring 28 in the connector body 10. Then, by threading, four remory metal rods 24 are installed into the anchor ring 28. Then the wedge ring 26 is installed which already has four remaining memory metal rods 24 attached. The memory metal lock ring 14 is then slid in and the first spatial ring 16. Then the load transfer collet 23 is inserted in eight sections into the connector body 10, and held in place with the second spacer ring 15. Then it is possible to slide in the remaining memory metal ring 13. Finally, the second lock wedge ring 25 is installed, fastened to four memory metal rods with threaded nuts and the second anchor ring 27 is attached to the remaining memory metal rods. Finally, the end of the connector body 10 is placed in position.

Tolerance Requirements—Since the memory metal rings will elongate as they move inward radially, axial preloads on load transfer surfaces are created during activation of the memory metal. The only assembly requirement is that the O-ring seals 18-20 must have sufficient preload for seal of circulating fluid used for the memory metal activation.

Product Sealing—The interface between the memory metal lock rings 13 and 14 and the pipe 11 is effectively sealed by radial contact under high load. The interface between the memory metal and the connector body 10 sees sliding contact during activation which is potentially bad for good sealing. Therefore, the memory metal lock rings are fitted with hollow metal rings 17 and 21 in grooves on this surface. A ring seal should roll over thereby avoiding sliding as the memory metal ring moves inwardly. The memory metal rings 13 and 14 will move radially about 0.75-inches maximum while the seal rings 17 and 21 will move half that, minimizing hoop strain.

Loads in Memory Metal—Memory metals considered most desirable for this subsea connector application will recover about 4% strain. It is desirable to have strain in the range of $\frac{3}{4}$% to 4% after the memory metal is activated. This guarantees stress in the memory metal of about 50,000 psi due to the flat shape of the stress-strain curve in this region. The memory metal therefore is made as thick as necessary to generate the desired force. The memory metal rings 13 and 14 are thick at the ends for large load transfers and low surface stress and to allow for taper of the wedge rings 26 and 27. The center of the memory metal rings 13 and 14 is smaller to avoid too high radial contact loads on the pipe 11. Other memory metal alloys with different stress-strain curves may also be used resulting in similar connector mechanisms with slightly different dimensions than those shown for illustration. The examples given here have assumed use of a copper-based memory metal alloy which is activated at above the normal ambient temperature of sea water. Use of memory metal alloy, based on nickel tend to generally require storage of the remory metal at temperatures well below the freezing point of sea water. It is considered desirable, although not absolutely necessary, to have a system operable in a wet underwater environment and for this reason, the higher temperature activating memory metal alloys are preferred.

In the event that threads do not work as well with some memory metal compositions as others, a bayonet type arrangement may be employed instead. The memory retal rods need not be especially tight after assembly, and various washer thicknesses may be used under nuts for makeup as desired.

It will be readily apparent that other embodiments and combinations will be apparent to those skilled in the art without departing from the spirit and scope of the invention above disclosed.

What is claimed is:

1. A connector for joining two pipe ends comprising, a connector housing associated with one pipe end and which is insertable over the other pipe end, memory metal means operative within the housing at a predetermined temperature to grip the other pipe end, additional memory metal means operative with the housing at a temperature higher than said predetermined temperature to grip the first said memory metal means, thereby securely attaching the housing to said other pipe end.

2. The connector of claim 1 wherein the first said memory metal means is at least one ring operative to shrink about the said other pipe end.

3. The connector of claim 2 wherein the additional memory metal means is at least one rod operative to drive a lock wedge ring into a gripping engagement between the connector housing and the first said memory metal means.

4. The connector of claim 1 wherein the first said memory metal means is at least two rings operative to shrink about the said other pipe end, at least one spacer ring separating the two memory metal rings, and wherein the additional memory metal means is at least two rods, each rod operative to drive a lock wedge ring from an opposite direction into gripping engagement between the connector housing and the respective memory metal ring.

* * * * *